United States Patent [19]
Pringle

[11] Patent Number: 6,166,814
[45] Date of Patent: Dec. 26, 2000

[54] METHOD AND APPARATUS FOR COLOR MATCHING PAINTS

[75] Inventor: Lon N. Pringle, Atlanta, Ga.

[73] Assignee: Georgia Tech Research Corp.

[21] Appl. No.: 09/164,254

[22] Filed: Sep. 30, 1998

Related U.S. Application Data

[60] Provisional application No. 60/060,431, Sep. 30, 1997.

[51] Int. Cl.[7] .................................................. G01N 21/55
[52] U.S. Cl. .............................................................. 356/445
[58] Field of Search ..................................... 356/445–448, 356/244, 319, 402, 405, 406; 364/526

[56] References Cited

U.S. PATENT DOCUMENTS

| | | | |
|---|---|---|---|
| 4,572,672 | 2/1986 | Orchard et al. | 356/446 |
| 4,711,580 | 12/1987 | Venable | 356/406 |
| 5,231,472 | 7/1993 | Marcus et al. | 356/402 |

*Primary Examiner*—Frank G. Font
*Assistant Examiner*—Michael P. Stafira
*Attorney, Agent, or Firm*—Todd Deveau; Ryan A. Schneider; Troutman Sanders LLP

[57] ABSTRACT

A method for characterizing a coating comprising a pigment and metallic flakes, said method by directing beams of light toward a coating; measuring the reflectance of light from the coating at the specular angle; measuring the reflectance of light from the coating at one or moren on-specular angles; analyzing said measured light at the specular and non-specular angles as a function of wavelength; and determining the K/S of the pigment and the volume fraction of said metal flakes within the coating from the measurements of the specular and non-specular reflectance; wherein K is the absorption cross-section of the pigment multiplied by its volume concentration; and S is the scattering cross-section of the pigment multiplied by its volume concentration.

11 Claims, 9 Drawing Sheets

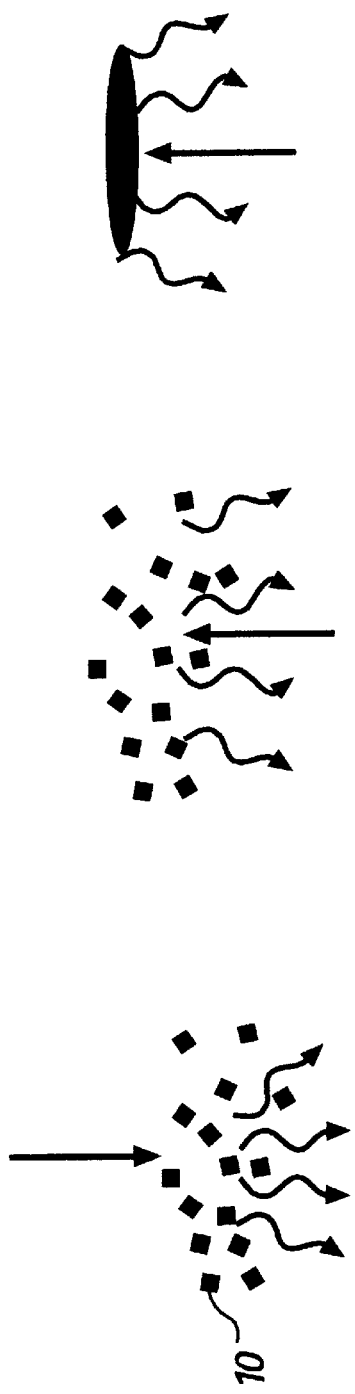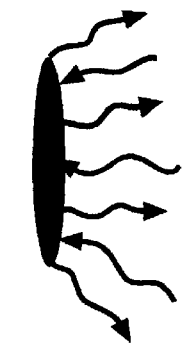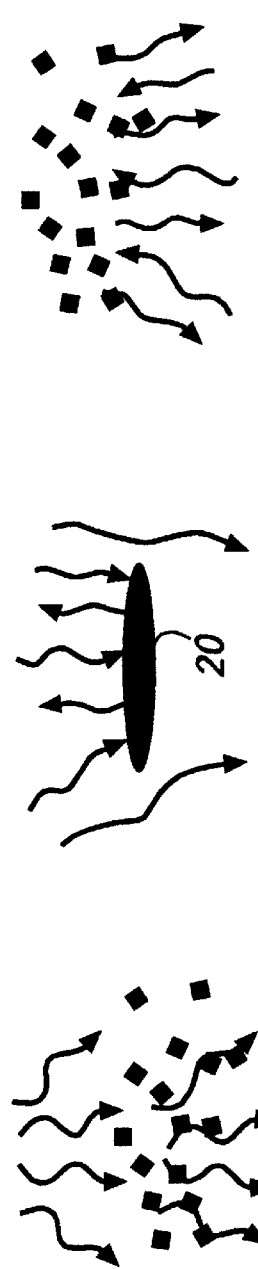

METHOD AND APPARATUS FOR COLOR MATCHING PAINTS

STATEMENT OF RELATED APPLICATION

This application claims priority from copending provisional application Ser. No. 60/060,431 filed Sep. 30, 1997.

BACKGROUND OF THE INVENTION

1. Field of the Invention

The present invention relates to the field of pigment characterization. More specifically, this invention concerns a method and apparatus for determining the flake concentration and spectral absorption of pigments for paints containing metal flakes.

2. Related Art

The scattering of light from non-flake paints can be predicted by assuming that the incident radiation consists of a combination of collimated light (from directed sources, such as the sun) and diffuse radiation (from the sky or from surrounding surface reflections) and by modeling the paint as diffusely scattering pigments immersed in a binder. The resulting equations for the light intensity in the paint as a function of depth (called Kabulka-Munk equations) can be solved, and from the solutions the emergent light intensity is calculated. This emergent light is mostly diffuse reflection from the pigments, which gives the paint its color; but it also includes some directional, or specular, reflection from the paint finish, which gives the paint its gloss. The fact that the solutions for the reflected light are well-behaved functions of the pigment absorption suggests that by measuring the emergent diffuse light at a number of wavelengths one can identify the pigments in the paint from the spectral shape of the absorption, and one can identify the concentration of the pigments from the magnitude of the absorption. An extensive discussion of the Kabulka-Munk equations and applications thereof is provided in U.S. Pat. No. 5,231,472 to Marcus, et al., incorporated herein by reference.

The predicted relationship between the diffuse reflectance and the pigments can be verified with measurements, and recently the hardware necessary to make these measurements has been efficiently packaged into hand-held spectrophotometers which can measure the reflected light and calculate the pigment types and concentrations in a shop environment. Note that experimental verification of the theory at the laboratory level using scientific instruments is an essential element in the design of such a hand-held instrument for two reasons. First, one cannot rely on the theory to predict the pigment absorption as a function of reflected light to high accuracy, since the Kabulka-Munk model is an approximation of the true physics. The handheld unit must have a accurate transformation between measured reflectance and pigment absorption stored in its memory. Thus, this transformation needs to be quantified experimentally, with the theory providing the ability to accurately interpolate between measurement points. Second, an instrument which measures the diffuse reflection by detecting the radiation coming off the sample over all non-specular angles is expensive and impractical for handheld packaging. Thus, laboratory experiments must determine which subset of reflection angles characterize the diffuse scattering well enough to accurately determine the total diffusely reflected radiation.

Flake paints, in which aluminum flakes are mixed into the binder with the pigment, cannot be reliably characterized with these hand-held spectrophotometers, either in their pigment type and volume concentration or their flake volume concentration. This is because the presence of the flakes significantly alters both the specular reflection and the diffuse reflection. The increase in specular reflection is most significant, since the flake surfaces are relatively flat and aligned parallel to the paint surface and thus reflect in a specular manner. But the flakes also affect the diffuse reflection, since the specular reflections from the flakes can be forward scattered by the pigments out of the surface and since the flakes diffusely reflect any diffuse light that is incident upon them.

U.S. Pat. No. 5,231,472 to Marcus, et al. provides a method of characterization of metallic paints by representing the reflected and scattered light as having components from the following: light from the incident beam which is reflected by the metal flakes toward the observer; light scattered by the colored pigments which is reflected by the metal flake towards the observer; and light scattered by the colored pigments towards the observer. The method disclosed therein is an iterative method which attempts to minimize the error between reflection measurements made on sample and "trial" coatings, which are attempts at making a match.

SUMMARY OF THE INVENTION

The process and apparatus of the current invention has added reflection contributions from the flakes to the Kabulka-Munk equations. The insertion of the flake reflection significantly complicates the equations, and the distribution of flakes must be modeled in a statistical manner. The present invention provides a method for characterizing metal flake containing paints comprising the steps of directing one or more beams of light toward the paint, measuring the reflectance of light at the specular angle, measuring the reflectance of light at one or more non-specular angles; and determining the K/S and r of the paint sample from the reflectance at the specular angle and the non-specular angle. K and S refer to the absorption and scattering cross-sections of the pigment multiplied by their volume concentrations, respectively; and r is the volume fraction of metal flakes within the paint.

An alternative embodiment of the invention provides a third measurement of diffuse light from a diffuse light source. This measurement allows K/S, r, and LS to be calculated exactly without the need to resort to a consistency condition to make the determination thereof.

The apparatus of the present invention comprises a light source providing collimated light toward said coating; a first light detector that measures specular reflection of the collimated light by said coating as a function of wavelength and generates a first signal indicative of the spectral intensity of the specular reflection; a second light detector that measures diffuse reflection of the collimated light by said coating as a function of wavelength and generates a second signal indicative of the spectral intensity of the diffuse reflection; and (d) a computer processor that determines the K/S and r combination for the.

BRIEF DESCRIPTION OF THE DRAWINGS

FIGS. 3A–G are graphical representations of absorption, scattering, and reflection of diffuse currents by pigments and flakes contained in a paint.

DETAILED DESCRIPTION OF A PREFERRED EMBODIMENT

Figure 1:
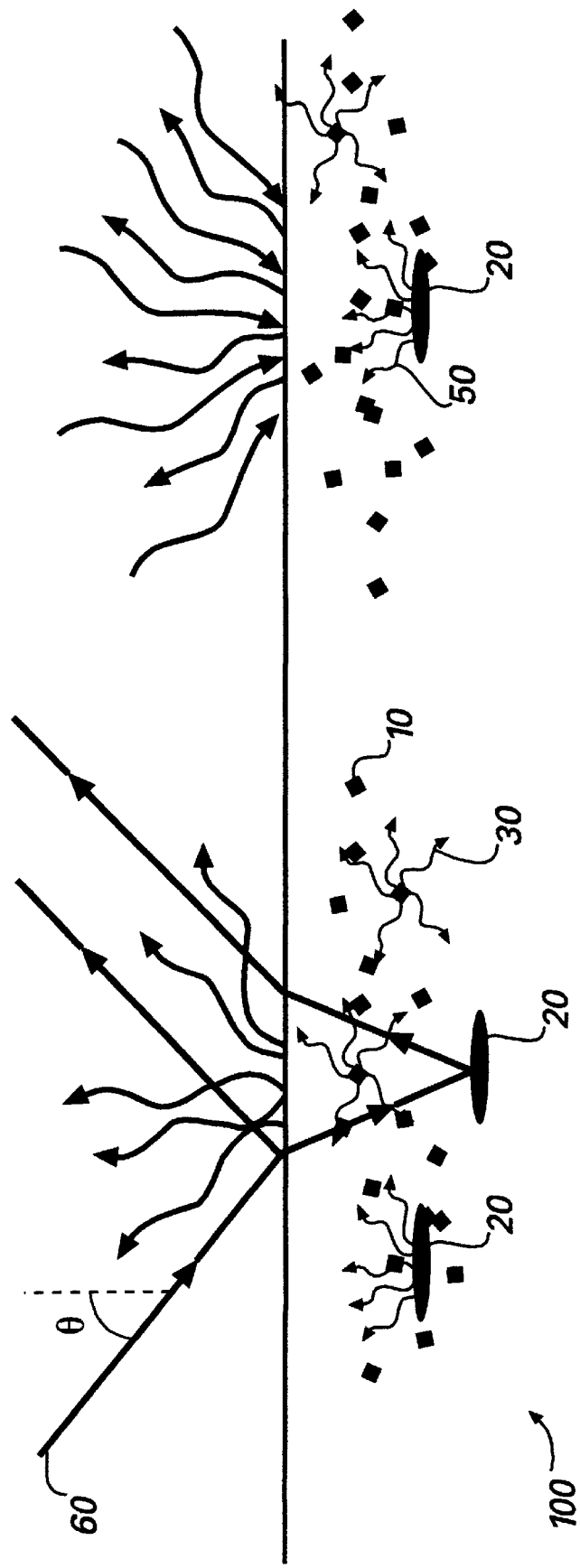
FIG. 1 is a graphical representation of a model of the physics in the absorption, scattering, and reflection of collimated and diffuse radiation incident upon a metal-flake and pigment-containing paint.

As shown in FIG. 1, metallic-flake containing paints 100 are modeled as a collection of metallic reflecting flakes 20 embedded in medium containing colored pigments 10. This model assumes that metal flakes scatter most of the collimated light specularly, but with a small diffuse component. A beam of collimated light 60 incident at an angle θ enters the paint 100 (index of refraction=n) and is attenuated by absorption and scattering 30 as it encounters pigments 10 in the paint. The collimated beam of light 60 will reach a metal flake 20 and be reflected 55 or scattered 50. If reflected, the beam of light will be attenuated once again by absorption and scattering as it travels through the paint and exits.

Collimated Currents

Figure 2A:
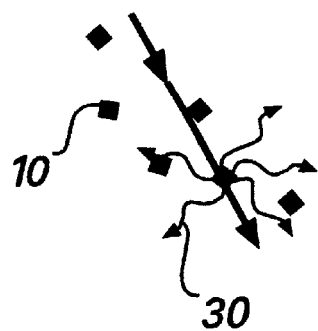
FIGS. 2A–C are graphical representations of absorption and scattering of collimated currents by pigments and flakes contained in a paint.
Figure 2B:
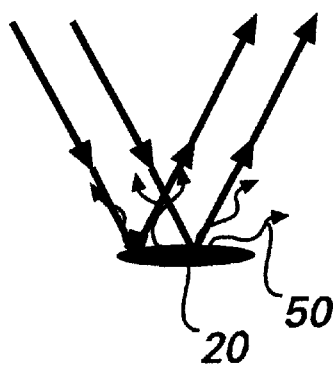
Figure 2C:
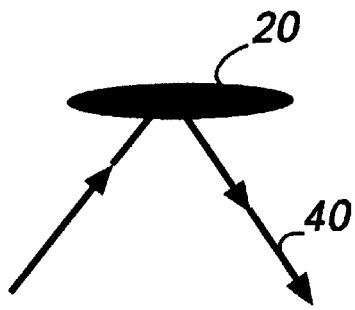

Referring now to FIG. 2, FIG. 2A depicts the absorption and scattering of collimated light by pigments contained in the paint. FIG. 2B depicts flake scattering of downward collimated light; while FIG. 2C depicts the scattering of up collimated light by flakes. The aggregate effect of these interactions upon the change in the "downward" current of collimated currents can be mathematically represented as:

| $\frac{dI_x}{dx} \cdot \cos(\theta) =$ | $-(K+S)(1-r)I_x$ | $+\frac{r\gamma}{L}I_y$ | $+-\frac{r}{L}I_x$ |
|---|---|---|---|
| Change in "Downward" Current | FIG. 2A: Pigment Absorption and Scattering | FIG. 2B: Flake Scattering | FIG. 2C: Flake Scattering of Up Collimated Current | where;

r≡volume fraction of flakes $$\frac{r}{L} \equiv \frac{r}{\text{flake volume}} \cdot \sigma_{flake} \approx \frac{r}{\text{flake thickness}}$$

γ=fraction of flake reflection which is specular

Solving these equations (assuming infinite depth):

$$\left.\frac{I_x}{I_y}\right\} = (\text{constant}) \cdot e^{\frac{-\alpha_1 x}{\cos\theta}}$$

$$\alpha_1 = \frac{1}{\text{radiation depth}} = \sqrt{\left\{(K+S)(1-r)+\frac{r}{L}\right\}^2 - \left(\frac{r}{L}\gamma\right)^2}$$

Because there exists a spatial region above the flake which has a zero probability of flake occupation, a correction in specular flake reflection is necessary. While, rigorous treatment requires ray-trace simulation, the Kabulka-Munk equations are valid for special cases. If the flake diameter is <<(4 tan θ)/ω, then the equations can be used as written. However, for flake diameter >>(4 tan θ)/ω, ignore $I_y$ attenuation by flakes, (where ω is the ratio of diffuse length to collimated path).

Diffuse Currents

Referring now to FIG. 3, FIG. 3A depicts forward scattering of downward collimated light at amplitude β; while FIG. 3B depicts back scattering of upward collimated light at amplitude 1-β. FIG. 3C depicts diffuse scattering of upward collimated light by flakes. FIG. 3D depicts the absorption and scattering of downward diffuse light. FIGS. 3E and 3G depict flake reflection of downward diffuse light and upward diffuse light respectively. Lastly, FIG. 3F depicts the back scattering of upward diffuse light.

Because absorption and scattering amplitudes vary between collimated and diffuse light, the method and apparatus disclosed herein assume path-length dependence. If the forward scattering amplitude=β and the back-scattering amplitude=(1-β), then the change in "downward" current of diffuse currents can be mathematically represented as:

| $\frac{dE_x}{dx}\cos =$ | $\beta S(1-r)I_x$ | $+ (1-\beta)S(1-r)I_y$ | $+ \frac{r}{L}(1-\gamma)I_y$ |
|---|---|---|---|
| Change in "Downward" Current | FIG. 3A: Forward scattering of downward collimated light | FIG. 3B: Back-scattering of upward collimated light | FIG. 3C: Diffuse scattering by flakes of upward collimated light |
| $+$ $-\omega(1-r)(K+S)E_x$ | | $+$ $-(1-r)\cdot\frac{r}{L}E_x$ | |
| | FIG. 3D: Absorption and scattering of downward diffuse light | FIG. 3E: Flake reflection of downward diffuse light | |
| $+$ $\omega(1-r)(1-\beta)SE_y$ | | $+$ $-(1-r)\cdot\frac{r}{L}E_x$ | |
| | FIG. 3F: Back-scattering of upward diffuse light | FIG. 3G: Flake reflection of upward diffuse light | |

Solving for the equation:

$$\left.\frac{E_x}{E_y}\right\} = (\text{constant}) \cdot e^{-\alpha_1 x} + (\text{constant}) \cdot e^{-\alpha_2 x}$$

$$\alpha_2 = \alpha(1-r)\sqrt{\left[\beta S - \frac{r}{(1-r)} - (K+S)\right]^2 - \left[(1-\beta)S + \frac{r}{(-r)L}\right]^2}$$

Figure 7:
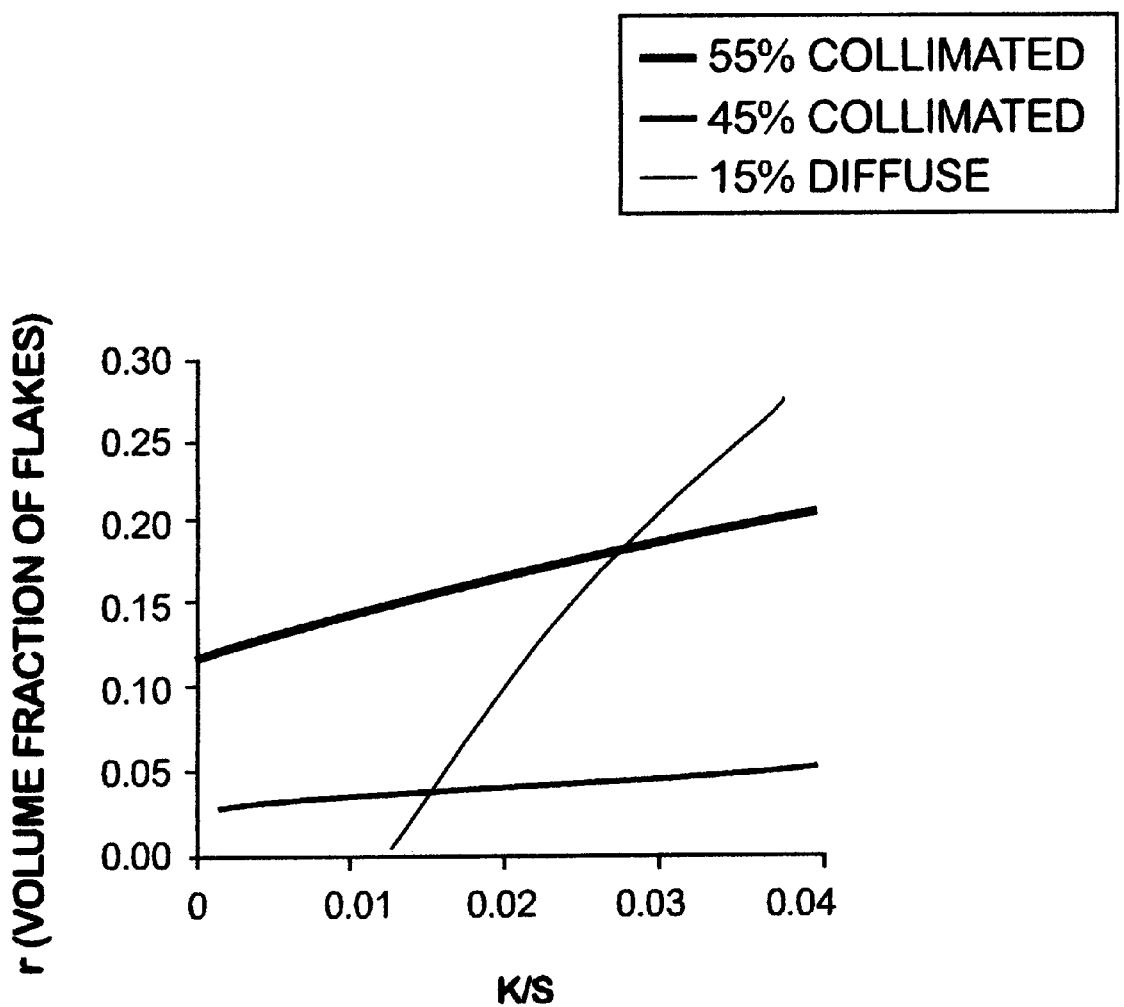
FIG. 7 is a graphical representation of calculated pairs of K/S and r values for a paint sample with varying reflection.

=(diffuse light depth)$^{-1}$
where;
r=Volume concentration of flakes
K/S=Ratio of pigment absorption to pigment scattering
L.S=Ratio of pigment scattering to flake scattering
γ=Fraction of flake reflection which is specular
β=Forward scattering amplitude
θ, $I_{in}$, $E_{in}$=Illumination conditions Because the complexity of solution hinders interpretation from functional form, graphical representation may be relied upon, as shown in FIG. 7.

The measurements of the diffuse and collimated reflection are used to determine r, K/S, and L.S either through algebraic calculation or comparison against a reference table compiled from either the disclosed formulae or from experimental observations. If calculated the values are determined as follows, where:

$I_o$≡amplitude of collimated illuminating light;
$E_o$≡amplitude of diffuse illuminating light;
$r_o$≡reflection of collimated light at the paint surface;
$r_e$≡reflection of diffuse light at the paint surface;
$r_i$≡internal reflection of the diffuse light at the paint surface;
K≡absorption coefficient of paint pigment;
S≡scattering coefficient of paint pigment;
1/L≡scattering coefficient of flake distribution;
γ≡fraction of collimated light which gets reflected off of a flake as collimated reflected light (near 1);
η≡average aspect ration of flakes (Diameter/L);
$θ_i$≡angle of incoming collimated light;
n≡index of refraction of paint binder;

the collimated light out of the paint with flakes can be represented by the formula $I_{yo}(1-r_o)+r_o I_o$ and the diffuse light out of the paint with flakes by the formula $E_o r_e + E_{yo}(1-r_I)$; where:

$$E_{yo} \equiv D2\frac{(EGE-G)}{H} + PE_y;$$

$$I_{yo} \equiv D1\left(\frac{B}{M-EGI}\right);$$

$$D2 \equiv \frac{D2N}{D2D};$$

$$D2D \equiv 1 - r_i\left(\frac{EGE-G}{H}\right);$$

$$D2N \equiv E_o(1-r_e) - PE_x + r \cdot PE_y;$$

$$PE_y \equiv \frac{\left[C + N \cdot \left(\frac{B}{M-EGI}\right) \cdot D1 - PE_x(EGI-G)\right]}{-H};$$

$$PE_x \equiv \frac{PE_xN}{PE_xD};$$

$$PE_xD \equiv H^2 + EGI^2 - G^2;$$

$$PE_xN \equiv \left[\left(C + N \cdot \left(\frac{B}{M-EGI}\right)\right) \cdot (EGI+G) + \left(-D - C \cdot \frac{B}{M-EGI}\right) \cdot H\right] \cdot D1;$$

$$D1 \equiv \frac{I_o(1-r_o)}{1 - r_o \cdot \frac{B}{(M-EGI)}};$$

$$EGE \equiv -\sqrt{G^2 - H^2};$$

$$EGI \equiv \frac{M - A - REGI}{2};$$

$$REGI \equiv \sqrt{(A+M)^2 - 4B^2 Z};$$

$$N \equiv (1-B) \cdot S \cdot (1-r \cdot Z) + r \cdot Z \cdot \frac{(1-\gamma)}{L};$$

$$M \equiv (K+S) \cdot (1-r \cdot Z) + r \cdot Z / L;$$

$$Z \equiv \exp\left[\frac{-(RZ \cdot \eta \cdot L)}{4 - \tan(\theta_{ir})}\right] \Big\} Z = 0 \text{ if } \theta_i = 0;$$

$$RZ \equiv \sqrt{\left[K+S+r\left(\frac{1}{L}-(K+S)\right)\right]^2 - B^2}$$

$$H \equiv \propto\left[(1-r) \cdot (1-B) \cdot S + \frac{r}{L}\right];$$

$$G \equiv \propto\left[(1-r) \cdot (BS - (K+S)) - \frac{r}{L}\right];$$

$$D \equiv (1-B) \cdot S \cdot (1-r) + \frac{r}{L}(1-\gamma);$$

$$C \equiv B \cdot S \cdot (1-r);$$

$$B \equiv \frac{r \cdot \gamma}{L};$$

$$A \equiv (K+S) \cdot (1-r) + \frac{r}{L}; \text{ and}$$

$$\theta_{ir} \equiv a\sin\left[\frac{\sin\theta_i}{n}\right].$$

Figure 4B:
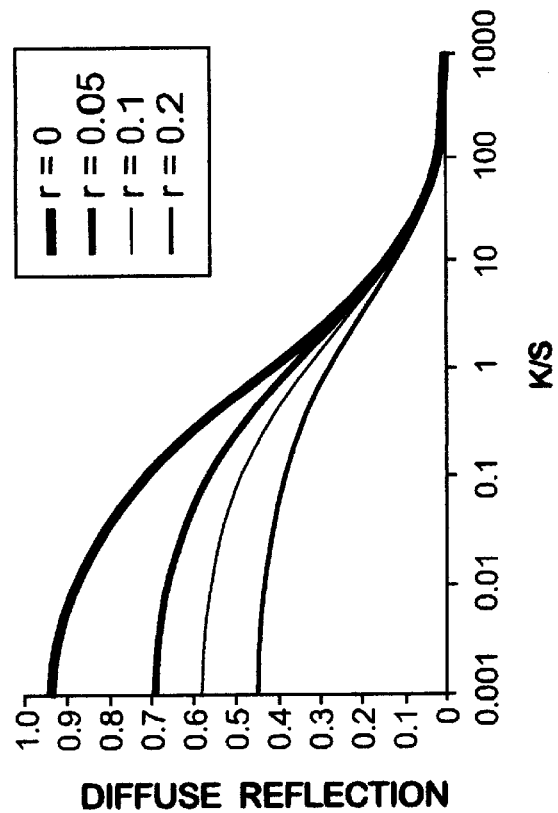
FIGS. 4A–B are graphical representations of the predicted fraction incident radiation which exits a flake paint sample as collimated and diffuse radiation as a function of K/S and the volume fraction of flakes.
Figure 4A:
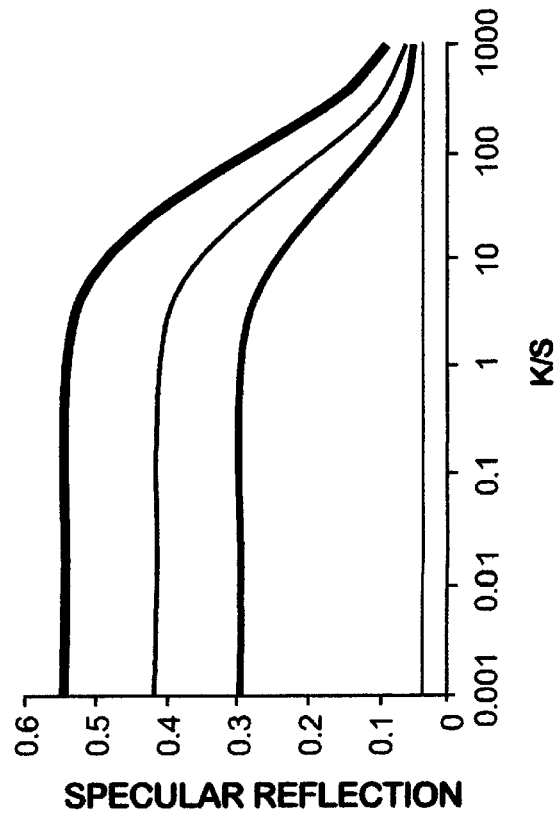

FIGS. 4A–B display calculated plots of the fraction of incident radiation which exits a flake paint sample as collimated (specular reflection) and as diffuse radiation as a function of K/S of the pigment for various volume fractions of flakes (volume fractions are labeled as r). K and S refer to the absorption and scattering cross-sections of the pigment multiplied by their volume concentrations, respectively. For these calculations, the ratio of pigment scattering and flake scattering (L.S) was held constant as 0.05. The incident light for this calculation is assumed to be completely collimated, and the light illuminates the sample of an angle of 45°. This figure shows that for low K/S (light paints) the addition of the flakes darkens the diffuse component of the reflection but increases the specular component. Conversely, flakes increase the diffuse reflection for dark paints.

This is expected, since the flakes are primarily specular reflectors. Photographic analysis of sample paint coupons has demonstrated this phenomenon. Non-flake paint coupons photographed near the specular angle appear darker than flake paint coupons photographed from the same angle. Conversely, non-flake paints appear brighter than flake paints when photographed far from the specular angle.

Figure 5:
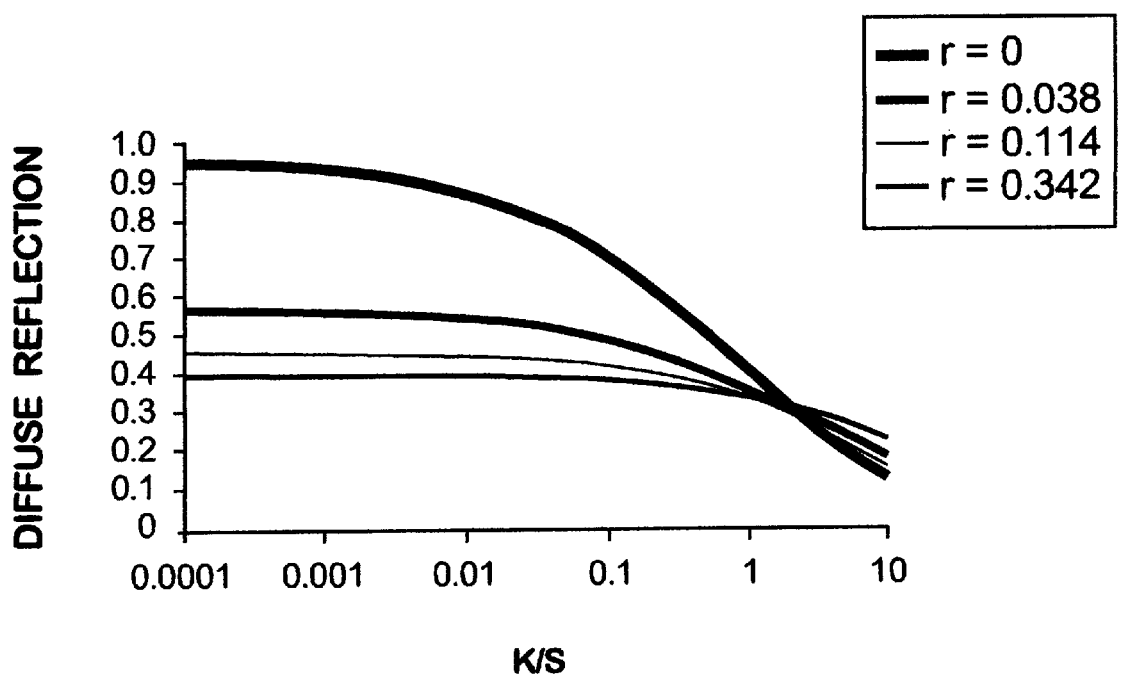
FIG. 5 is a graphical representation of the same physical situation as FIG. 1, except the flakes are assumed to reflect 10% of the collimated light incident upon them in a diffuse manner.

Although difficult to observe from the plot of FIG. 4B due to the scale, the diffuse reflection curves actually cross each other at high K/S, so that the diffuse reflection actually increases slightly with increasing flake concentration when mixed with pigments of high K/S. This is because the replacement of some absorbing pigment with scatterers (the flakes) decreases the absorption and increases the diffuse scattering off of the pigment. This effect is even greater if the flakes themselves are given a small diffuse scattering amplitude due to their own surface roughness, misalignment of the flake surfaces, and scattering off of flake edges. FIG. 5 displays a calculated plot of the diffuse scattering as a function of K/S and flake volume concentration in the same physical situation as in FIG. 4 except 10 percent of the flake reflections of collimated light are assumed to be diffuse. For these calculations L.S=0.01.

This phenomenon can be observed when flakes are added to dark gray paint. At the specular angle, the flake paint appears lighter than when viewed far from specular. Photographs taken 90° off the specular angle show that the diffuse component of reflection also increase with the addition of flakes to dark paints.

Figure 6B:
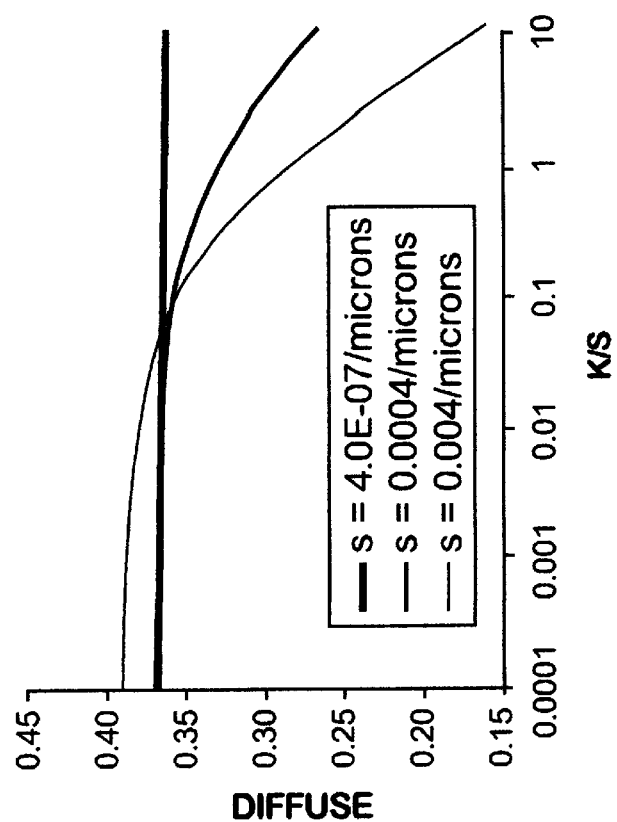
FIGS. 6A–B are graphical representations of incident collimated light which exits a flake paint sample as collimated and diffuse radiation as a function of K/S and S (proportional to the volume concentration of the pigment).
Figure 6A:
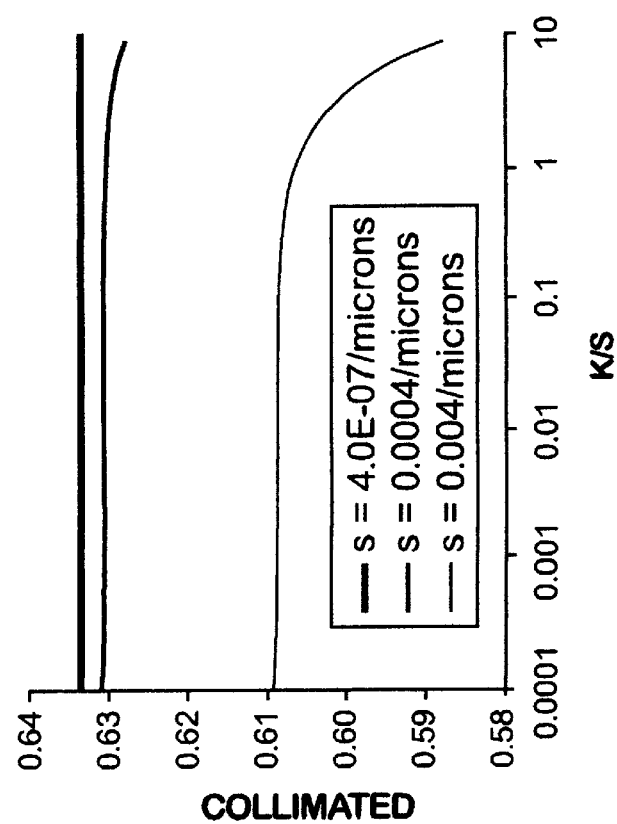

Calculations using the formulae disclosed above also correctly predict the effect of adding pigment to a binder that initially contains only flakes. FIGS. 6A–B show calculated plots of the fraction of incident collimated radiation (45 degrees) which exits the flake paint as diffuse and collimated radiation for a sample of pure flakes (dark line) and samples with two different quantities of pigment added (given by different quantities of S). For these calculations, L.S is constant at 0.01. Note that the addition of a light pigment (low K/S) causes the collimated reflectance to decrease, although the diffuse reflectance increases. This is the so-called flop characteristic of low-absorbing flake paints. These paints appear lighter when viewed off-specular than when viewed near-specular. The plots of FIGS. 6A–B also show that the addition of darker pigments to pure flakes decreases both the specular reflection and the diffuse reflection.

By making separate measurements of the diffuse reflection and one or more specular reflections, the present method can unambiguously identify the K/S of the pigment and the volume fraction of the flakes, (r) for flake paints. FIG. 7 shows the plots of the predicted pairs of K/S and r combinations which give a diffuse reflection of 15 percent (lightly shaded line) and specular reflections of both 45 percent (mid-shaped line) and 55 percent (dark line). Note that there is a single intersection, and thus a single designation of K/S and r for each combination of diffuse and reflected radiation for any L.S (ratio of pigment scattering to flake scattering) at each wavelength. This fact enables the construction of a spectrophotometer, much like the one used presently for non-flake paints, which can take measurements of the reflection at a few discrete angles and process these measurements into pigment absorption, pigment volume concentration, and flake volume concentration. As in the previous calculations, the incident radiation is completely collimated and incident upon the sample at 45 degrees.

The apparatus preferably has K/S, L.S, and r combinations for different diffuse and specular measurements stored in memory. Such values are easily calculated by computer or other suitable calculating means. By way of example, attached hereto as Attachment A, is C-language source code for outputting the amount of diffuse light out, collimated light out, and the sum and ratio thereof, based upon calculations of various r, K/S, and L.S values. The intersection would be calculated or otherwise determined in the instrument. If this is done at many wavelengths, the spectral shape and magnitude of the K/S values will identify the type and concentration of the pigment, and the many calculated r values (one for each wavelength) can be averaged to yield a flake concentration. Since the many r values are redundant, the standard deviation of these values supply the user with an estimate of the accuracy of the result.

In one embodiment of the method and apparatus of the present invention, the diffuse and specular reflection from a collimated source will be measured at a plurality of wavelengths, preferably with 1.0 nm to 20 nm resolution. Measurements should be taken at a minimum of 3 different wavelengths, and preferably, at not less than 10 different wavelengths. While the chosen wavelengths are preferably within the visible spectrum, it is not necessary. Traditionally, measurements are taken at 31 wavelengths at 10 nm intervals along the visible spectrum. The measured reflection values are compared to a table or other collection of predicted values as a function of r, K/S, and L.S. The table is searched for match of predicted and measured values such that r is constant.

Alternatively, algebraic calculations well within the ability of those skilled in the art could be substituted for the look-up table. As discussed in more detail below, while a completely collimated incident beam is used for compatibility with existing hardware, preferably a diffuse source is additionally employed and used to establish uniqueness.

Preferably, one skilled in the art would find a set of measurement angles, with only routine experimentation, such that the integrated specular and diffuse reflections are a single-value function of the reflection measurements at these angles. The algebraic formulas and/or look-up table relating these measurements to K/S, L.S, and r could be easily developed from the measurements.

In the most preferred embodiment of the invention, the integrated diffuse reflection from a diffuse light source is measured at a plurality of wavelengths in addition to measuring the specular and diffuse reflections from collimated illumination. The diffuse illumination is preferably accomplished with an integrating sphere. The diffuse illumination/diffuse reflection measurement will yield a pairing of r and K/S values for any assumed value of L.S that is completely independent of the pairing obtained from the reflection measurements of collimated illumination. The actual values of r, K/S, and L.S values are the ones that satisfy both measurements.

Figure 8B:
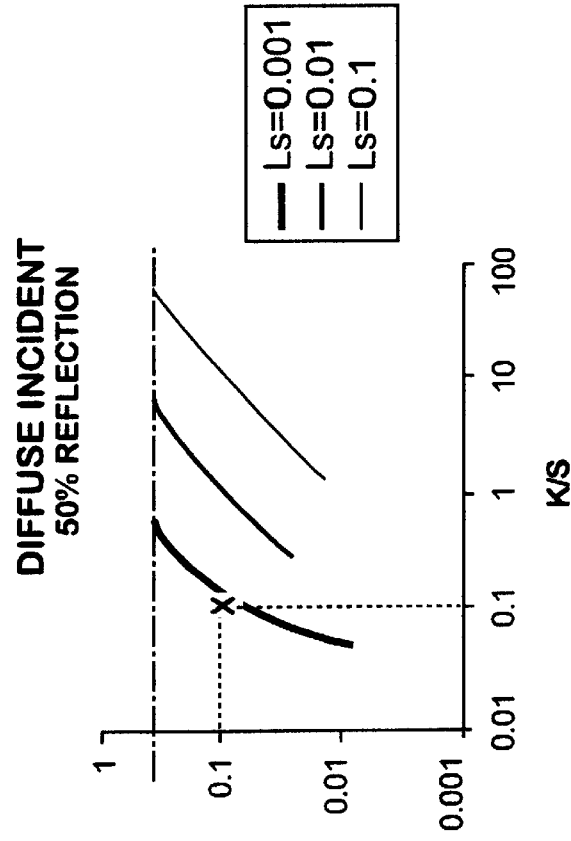
FIGS. 8A–B are graphical representations of calculated pairs of K/S and r values for a paint sample for collimated incident and diffuse incident illumination, respectively.
Figure 8A:
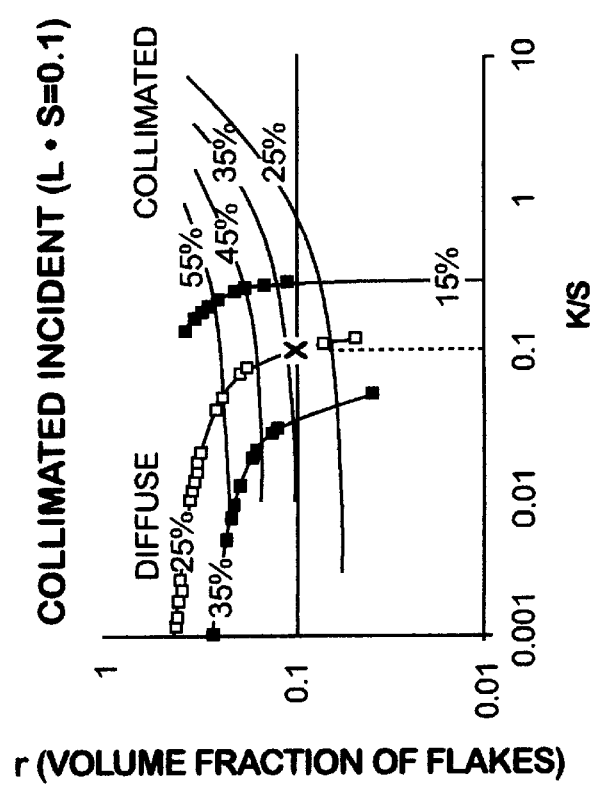

FIG. 8A provides an example for which, for an L.S of 0.1, the intersection of the diffuse reflection and collimated reflection curves requires that the r=0.1 and the K/S=0.1. For the L.S, the pairings are different. FIG. 8B shows that the same r and K/S pairing is valid for the diffuse illumination/diffuse reflection measurements, which means that, for this case, r=0.1 (ten percent flakes by volume), K/S=0.1, and L.S=0.1. This same type of calculation must be achieved at every wavelength. This will produce a r, K/S, and L.S for each wavelength. Because r is a constant, the value solved for each wavelength should be constant and any variance in r can be utilized as a measure of the accuracy of the result.

Note that no mention of the flake size has been made in reference to these predictions. The revised Kabulka-Munk equations show the flake parameters which determine the character of the exiting radiation are the volume fraction of the flakes and the fraction of metallic surface area in any particular "slice" within the paint. The actual surface area of an average flake has little effect on the radiation quantities unless a change in surface area is accompanied by a change in the fraction of metallic surface area. Thus, the determination of the flake surface size (if necessary) must be carried out independently. Presently, flake surface size is measured visually (fine, medium and large). However, the surface size can be accurately measured in the same manner that granularity is measured in photographic film. This is done by measuring the statistical fluctuations from the reflection of a spot that slides in position across the surface at a constant velocity. Such a sliding-spot measurement means can optionally be incorporated into the apparatus of the invention.

Note also that the above predictions are sensitive to the thickness of the flakes in that the thickness and the volume concentration of flakes determines the percentage of metallic surface area. All of the above graphically represented calculations were made with an assumed flake thickness of 25 microns. Because of this sensitivity, it is preferable that the metallic paints on which this instrument is used have flakes of roughly the same thickness, or at least have a thickness that is a known function of some known other parameter, such as the flake surface size.

Figure 9:
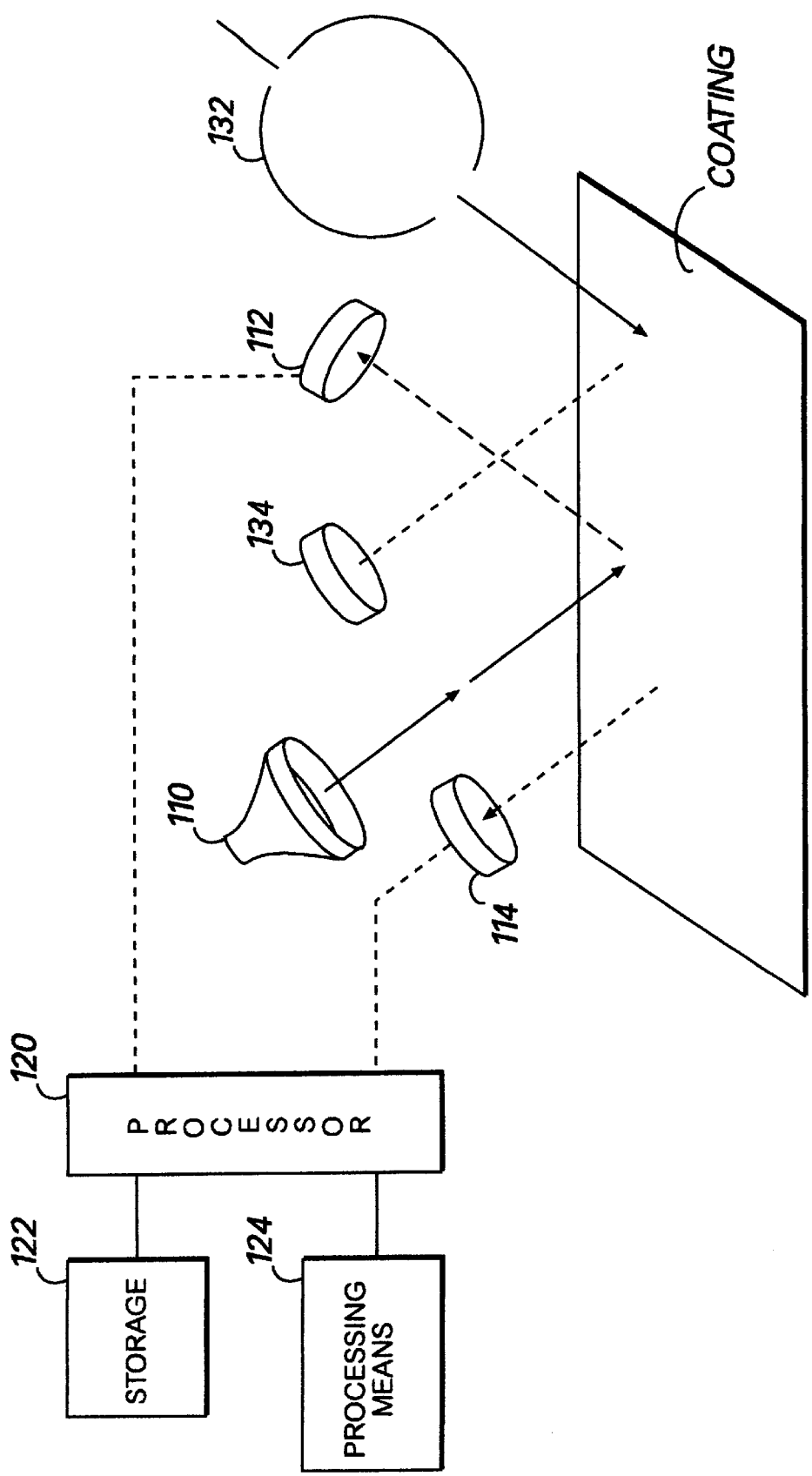
FIG. 9 is a schematic diagram with blocks illustrating a preferred embodiment of the apparatus of the present invention.

As illustrated in FIG. 9, the apparatus of the present invention comprises (a) a light source 110 providing collimated light toward said coating; (b) a first light detector 112 that measures specular reflection of the collimated light by said coating as a function of wavelength and generates a first signal indicative of the spectral intensity of the specular reflection; (c) a second light detector 114 that measures diffuse reflection of the collimated light by said coating as a function of wavelength and generates a second signal indicative of the spectral intensity of the diffuse reflection; and (d) a computer processor 120 that determines the K/S and r combination for said coating from said first signal and said second signal; wherein r is the volume fraction of metal flakes within the coating; K is the absorption cross-section of the pigment multiplied by its volume concentration; and S is the scattering cross-section of the pigment multiplied by its volume concentration.

The computer processor of the apparatus can further comprise comprise memory storage 122 to previously determined K/S and r combinations for a plurality of diffuse and specular measurements; and processing means 124 for determining the K/S and r combination by comparing said previously determined K/S and r combinations with said measured specular reflection and said measured diffuse reflection.

The apparatus of the present invention can further include an integrating sphere 132 for illuminating said coating with diffuse light; and a light detector 134 for receiving and measuring the reflectance of said diffuse light at a non-specular angle as a function of wavelength. This provides an additional measurement with which to ensure the uniqueness of the solution for the coating characterization parameters.

Although the present invention has been described with reference to preferred embodiments, it will be apparent to those skilled in the art that variations and modifications of the present invention are within the spirit and scope of the present invention.

What is claimed is:

1. A method for characterizing a coating comprising a pigment and metallic flakes, said method comprising the steps of:
   a. directing one or more beams of light toward said coating;
   b. measuring the reflectance of light from said coating at the specular angle;
   c. measuring the reflectance of light from said coating at one or more non-specular angles;
   d. analyzing said measured light at the specular and non-specular angles as a function of wavelength; and
   e. determining the K/S of said pigment and the volume fraction of said metal flakes within said coating from the measurements of the specular and non-specular reflectance;
   wherein K/S is the ratio of pigment absorption to pigment scattering.

2. A method as claimed in claim 1, wherein said beam of light is collimated.

3. A method as claimed in claim 2, further comprising the steps of:
   illuminating said coating with diffuse light; and
   measuring the reflectance of said diffuse light.

4. A method for characterizing a coating comprising a pigment and metallic flakes, said method comprising the steps of:
   a. directing a beam of collimated light toward said coating;
   b. measuring the reflectance of light from said coating at the specular angle and analyzing said light as a function of wavelength;
   c. measuring the reflectance of light from said coating at one or more non-specular angles and analyzing said light as a function of wavelength;
   d. illuminating said coating with diffuse light;
   e. measuring the reflectance of said diffuse light from said coating;
   f. determining L.S, K/S, and r, from the measurements in steps (b), (c), and (e), wherein K/S is the ratio of pigment absorption to pigment scattering; L.S is the ratio of pigment scattering to flake scattering; and r is the volume concentration of flakes.

5. A method as claimed in claim 4, where in said step of determining L.S, K/S, and r comprises comparing the measurements in steps (b), (c), and (e) to known values for a given value for each combination of L.S, K/S, and r.

6. A method for characterizing a coating comprising a pigment and metallic flakes, said method comprising the steps of:

a. directing one or more beams of light toward said coating;

b. measuring the reflectance of light from said coating at the specular angle;

c. measuring the reflectance of light from said coating at one or more non-specular angles;

d. analyzing said measured light at the specular and non-specular angles as a function of wavelength;

e. characterizing the measurement of the specular reflectance as $I_{yo}(1-r_o)+r_oI_0$ and the measurement of the non-specular reflectance as $E_or_e+E_{yo}(1-r_t)$;

where $$E_{yo} \equiv D2\frac{(EGE-G)}{H} + PE_y;$$

$$I_{yo} \equiv D1\left(\frac{B}{M-EGI}\right);$$

$$D2 \equiv \frac{D2N}{D2D};$$

$$D2D \equiv 1 - r_i\left(\frac{EGE-G}{H}\right);$$

$$D2N \equiv E_o(1-r_e) - PE_x + r \cdot PE_y;$$

$$PE_y \equiv \frac{\left[C + N \cdot \left(\frac{B}{M-EGI}\right) \cdot D1 - PE_x(EGI-G)\right]}{-H};$$

$$PE_x \equiv \frac{PE_xN}{PE_xD};$$

$$PE_xD \equiv H^2 + EGI^2 - G^2;$$

$$PE_xN \equiv \left[\left(C + N \cdot \left(\frac{B}{M-EGI}\right)\right) \cdot (EGI+G) + \left(-D - C \cdot \frac{B}{M-EGI}\right) \cdot H\right] \cdot D1;$$

$$D1 \equiv \frac{I_o(1-r_o)}{1 - r_o \cdot \frac{B}{(M-EGI)}};$$

$$EGE \equiv -\sqrt{G^2 - H^2};$$

$$EGI \equiv \frac{M - A - REGI}{2};$$

$$REGI \equiv \sqrt{(A+M)^2 - 4B^2Z};$$

$$N \equiv (1-B) \cdot S \cdot (1-r \cdot Z) + r \cdot Z \cdot \frac{(1-\gamma)}{L};$$

$$M \equiv (K+S) \cdot (1-r \cdot Z) + r \cdot Z / L;$$

$$Z \equiv \exp\left[\frac{-(RZ \cdot \eta \cdot L)}{4 - \tan(\theta_{ir})}\right] \Big\} Z = 0 \text{ if } \theta_i = 0;$$

$$RZ \equiv \sqrt{\left[K + S + r\left(\frac{1}{L} - (K+S)\right)\right]^2 - B^2}$$

$$H \equiv \propto \left[(1-r) \cdot (1-B) \cdot S + \frac{r}{L}\right];$$

$$G \equiv \propto \left[(1-r) \cdot (BS - (K+S)) - \frac{r}{L}\right];$$

$$D \equiv (1-B) \cdot S \cdot (1-r) + \frac{r}{L}(1-\gamma);$$

$$C \equiv B \cdot S \cdot (1-r);$$

$$B \equiv \frac{r \cdot \gamma}{L};$$

$$A \equiv (K+S) \cdot (1-r) + \frac{r}{L}; \text{ and}$$

$$\theta_{ir} \equiv a\sin\left[\frac{\sin\theta_i}{n}\right];$$

in which $I_o$ is the amplitude of collimated illuminating light;

$E_o$ is the amplitude of diffuse illuminating light;

$r_o$ is the reflection of collimated light at the surface of said coating;

$r_e$ is the reflection of diffuse light at the surface of said coating;

$r_i$ is the internal reflection of the diffuse light at the surface of said coating;

K is the absorption coefficient of said pigment;

S is the scattering coefficient of said pigment;

1/L is the scattering coefficient of the flake distribution;

γ is the fraction of collimated light which gets reflected off of a flake as collimated reflected light (near 1);

η is the average aspect ratio of said flakes (Diameter/L);

$\theta_i$ is the angle of incoming collimated light; and n is the index of refraction of said coating.

7. An apparatus for characterizing a coating comprising a pigment and metallic flakes, said apparatus comprising:
   a. a light source providing collimated light toward said coating;
   b. a first light detector that measures specular reflection of the collimated light by said coating as a function of wavelength and generates a first signal;
   c. a second light detector that measures diffuse reflection of the collimated light by said coating as a function of wavelength and generates a second signal; and
   d. a computer processor that determines the K/S and r combination for said coating from said first signal and said second signal;

wherein r is the volume fraction of metal flakes within the coating and K/S is the ratio of pigment absorption to pigment scatter.

8. An apparatus as claimed in claim 7, wherein said computer processor comprising
   d1. memory storage for storing previously determined K/S and r combinations for a plurality of diffuse and specular measurements; and
   d2. processing means for determining the K/S and r combination by comparing said previously determined K/S and r combinations with said measured specular reflection and said measured diffuse reflection.

9. An apparatus as claimed in claim 8, further comprising:
   an integrating sphere for illuminating said coating with diffuse light; and
   a light detector to measure the reflectance of said diffuse and generate a third signal.

10. An apparatus as claimed in claim 7, wherein said computer processor calculates K/S and r by mathematically solving for K/S and r by characterizing the measurement of the specular reflectance as $I_{yo}(1-r_o)+r_o I_o$ and the measurement of the non-specular reflectance as $E_o r_e + E_{yo}(1-n)$; where $$E_{yo} \equiv D2 \frac{(EGE - G)}{H} + PE_y;$$

$$I_{yo} \equiv D1 \left( \frac{B}{M - EGI} \right);$$

$$D2 \equiv \frac{D2N}{D2D};$$

$$D2D \equiv 1 - r_i \left( \frac{EGE - G}{H} \right);$$

$$D2N \equiv E_o(1 - r_e) - PE_x + r \cdot PE_y;$$

$$PE_y \equiv \frac{\left[ C + N \cdot \left( \frac{B}{M - EGI} \right) \cdot D1 - PE_x(EGI - G) \right]}{-H};$$

$$PE_x \equiv \frac{PE_x N}{PE_x D};$$

$$PE_x D \equiv H^2 + EGI^2 - G^2;$$

$$PE_x N \equiv \left[ \left( C + N \cdot \left( \frac{B}{M - EGI} \right) \right) \cdot (EGI + G) + \left( -D - C \cdot \frac{B}{M - EGI} \right) \cdot H \right] \cdot D1;$$

$$D1 \equiv \frac{I_o(1 - r_o)}{1 - r_o \cdot \frac{B}{(M - EGI)}};$$

$$EGE \equiv -\sqrt{G^2 - H^2};$$

$$EGI \equiv \frac{M - A - REGI}{2};$$

$$REGI \equiv \sqrt{(A + M)^2 - 4B^2 Z};$$

$$N \equiv (1 - B) \cdot S \cdot (1 - r \cdot Z) + r \cdot Z \cdot \frac{(1 - \gamma)}{L};$$

$$M \equiv (K + S) \cdot (1 - r \cdot Z) + r \cdot Z / L;$$

$$Z \equiv \exp\left[ \frac{-(RZ \cdot \eta \cdot L)}{4 - \tan(\theta_{ir})} \right]$$

$$RZ \equiv \sqrt{\left[ K + S + r\left( \frac{1}{L} - (K + S) \right) \right]^2 - B^2} \quad \Big\} Z = 0 \text{ if } \theta_i = 0;$$

$$H \equiv \propto \left[ (1 - r) \cdot (1 - B) \cdot S + \frac{r}{L} \right];$$

$$G \equiv \propto \left[ (1 - r) \cdot (BS - (K + S)) - \frac{r}{L} \right];$$

-continued $$D \equiv (1-B) \cdot S \cdot (1-r) + \frac{r}{L}(1-\gamma);$$

$$C \equiv B \cdot S \cdot (1-r);$$

$$B \equiv \frac{r \cdot \gamma}{L};$$

$$A \equiv (K+S) \cdot (1-r) + \frac{r}{L}; \text{ and}$$

$$\theta_{ir} \equiv a\sin\left[\frac{\sin\theta_i}{n}\right];$$

in which
- $I_o$ is the amplitude of collimated illuminating light;
- $E_o$ is the amplitude of diffuse illuminating light;
- $r_o$ is the reflection of collimated light at the surface of said coating;
- $r_e$ is the reflection of diffuse light at the surface of said coating;
- $r_i$ is the internal reflection of the diffuse light at the surface of said coating;
- K is the absorption coefficient of said pigment;
- S is the scattering coefficient of said pigment;
- 1/L is the scattering coefficient of the flake distribution;
- $\gamma$ is the fraction of collimated light which gets reflected off of a flake as collimated reflected light (near 1);
- $\eta$ is the average aspect ratio of said flakes (Diameter/L);
- $\theta_i$ is the angle of incoming collimated light; and
- n is the index of refraction of said coating.

11. A method as claimed in claim 3, further comprising the step of determining L.S and r, wherein L.S is the ratio of pigment scattering to flake scattering, and r is the volume concentration of flakes.

* * * * *